July 28, 1959

G. A. HILL 2,896,719

OIL RECOVERY PROCESS

Filed Feb. 3, 1956

DEPTH OF LIQUID

PERCENT WATER SATURATION

*INVENTOR.*
GILMAN A. HILL

BY

ATTORNEYS

July 28, 1959   G. A. HILL   2,896,719
OIL RECOVERY PROCESS
Filed Feb. 3, 1956   3 Sheets-Sheet 2

INVENTOR.
GILMAN A. HILL
BY
ATTORNEYS

July 28, 1959 G. A. HILL 2,896,719
OIL RECOVERY PROCESS
Filed Feb. 3, 1956 3 Sheets-Sheet 3
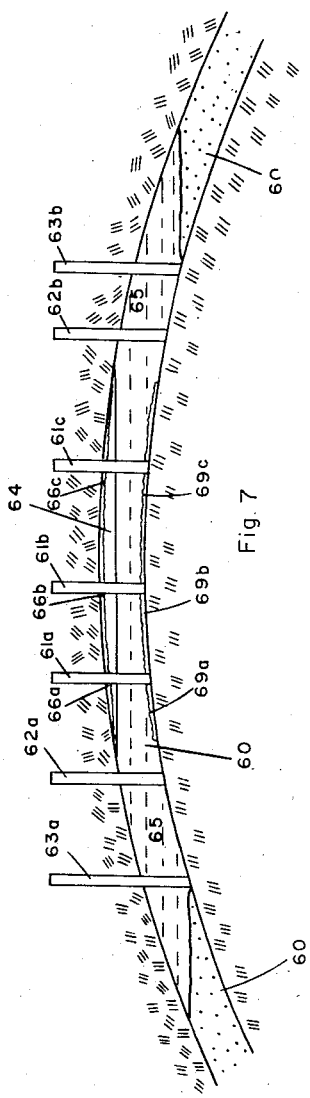
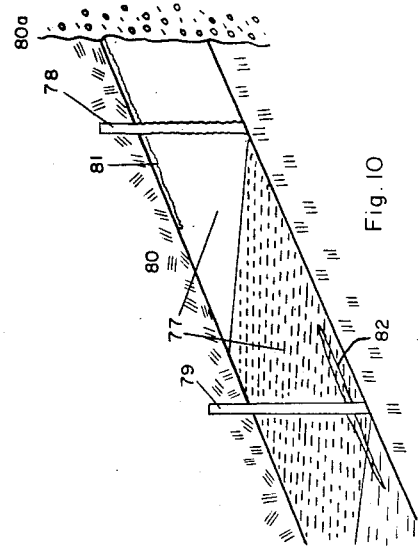
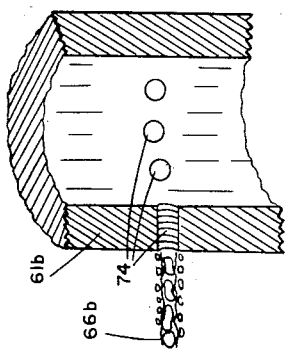
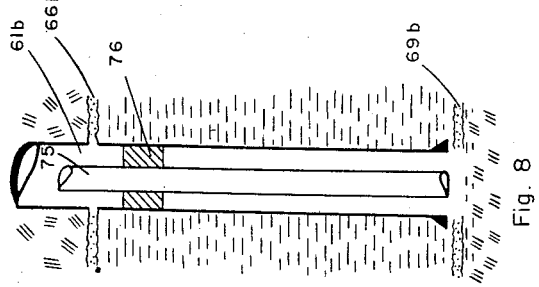
*INVENTOR.*
GILMAN A. HILL
BY
ATTORNEYS

United States Patent Office 2,896,719
Patented July 28, 1959

2,896,719

OIL RECOVERY PROCESS

Gilman A. Hill, Englewood, Colo., assignor to Petroleum Research Corporation, Denver, Colo., a corporation of Colorado Application February 3, 1956, Serial No. 563,301

10 Claims. (Cl. 166—42)

My invention relates to a process for increasing the recovery of oil from oil-bearing formations and particularly to an improved method using water and gas for increasing the recovery of oil and which may be employed effectively both during normal production and after depletion of the reservoir.

It is well known that the primary production of oil from oil-bearing formations resulting from the natural energy of the formation may average less than half of the oil content of the formation. It has, therefore, become a general practice to employ various types of secondary production processes in order to increase the recovery beyond that possible from primary production. The most frequently employed secondary production methods involve fluid drive of the oil remaining in depleted reservoirs and require that water or gas or both be introduced under pressure to secure water flooding or gas drive or a combination of the two and may involve the use of water charged with gas under pressure. Other secondary production methods, by way of example, involve thermal treatment of the formation, chemical treatment, and the use of ultrasonic energy. The degree of recovery by secondary production methods differs for different types of oil reservoirs; however, even when the recovery is relatively high substantial amounts of oil remain in the reservoir and cannot be recovered economically by the secondary production methods heretofore known. It follows that vast quantities of oil remain in depleted reservoirs. Accordingly, it is an object of my invention to provide an improved and economical method for recovering oil from oil-bearing formations.

It is another object of my invention to provide an improved method for recovering oil from oil-bearing formations which method is simple and economical to apply and which secures a greatly increased recovery of oil.

It is another object of my invention to provide an improved method for increasing the rate of production of oil from a reservoir.

It is another object of my invention to provide an improved method for recovering oil from oil-bearing formations which method may be employed advantageously to augment the primary production of oil before depletion of the formation thereby and increases the total production.

Briefly, in carrying out the objects of this invention in one embodiment of the method thereof, an oil reservoir, having a gas zone and at least one well, is fractured over a substantial area in the upper portion of the gas zone and water is injected into the fractured area. The rate of admission of water to the fractured area is determined by the characteristics of the oil-bearing formation; the rate is selected to provide a predetermined degree of water saturation such that the average rate of flow of water by gravity through the oil-bearing structure will provide continuous water-gas interfaces extending downwardly through the reservoir throughout a substantial volume thereof. The flow of water is regulated to enable oil which is normally held by capillary forces in discontinuous bodies to be released from their positions and then flow downwardly over the continuous water-gas interface and collect at the bottom of the gas zone where it may be removed. The term "water-gas interface" is employed herein to designate the surface boundary between the water and the gas and this interface is considered as existing regardless of the presence of a thin film of oil or other contamination on the surface of the water.

The features of novelty which characterize my invention are set forth in the appended claims. My invention itself, however, together with further objects and advantages thereof may best be understood by reference to the accompanying drawings in which:

Fig. 7 is a diagrammatic vertical section view through an oil reservoir illustrating an application of my invention;

Fig. 8 is an enlarged detail view of one of the wells of Fig. 7;

Fig. 9 is an enlarged view partly in section of the casing and fractured zone; and Fig. 10 is a vertical section through an oil reservoir illustrating another application of my invention.

Figure 1:
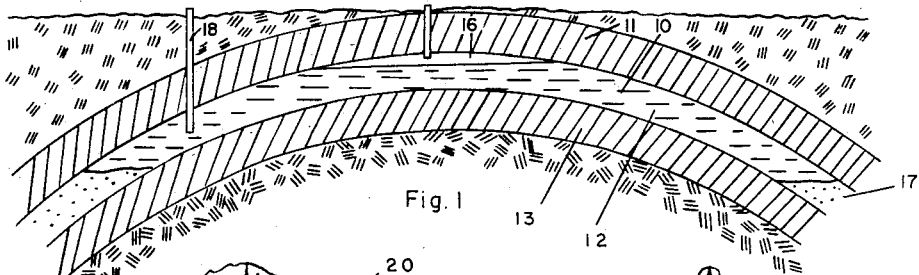
Fig. 1 is a diagrammatic sectional elevation view through an oil dome in which the process of my invention may be practiced.

Crude oil or petroleum is found in nature in reservoirs comprising bodies of permeable sand or other rock in which the oil has collected by migration below caps or strata of relatively impermeable material which provides a trap and prevents further upward migration of the oil. By way of example the dome illustrated in Fig. 1 holds a body of oil trapped in a zone 10 below an overlying bed of shale 11 in a permeable sandstone reservoir 12. Another layer of relatively impermeable material 13 defines the lower face of the oil-bearing formation. The body of oil 10 lies between a gas zone or cap 16 and a water zone 17. A producing well 18 has been drilled through the overlying sediments and into the oil zone 10. During primary production, the oil is removed through the well. If the reservoir pressure decreases as a result of this production, then some of the gas dissolved in the oil will come out of solution and will rise upward to the gas cap thereby increasing the depth of the gas cap; furthermore, the reduction of pressure will expand the gas cap already present. If the oil-bearing reservoir is a portion of a large aquifer of high permeability, then the encroachment of water from the aquifer may maintain the pressure at or near the original value. In this case the gas cap, if present, does not expand and dissolved gas is not evolved from the oil. The volume of oil produced is replaced by water encroaching from the edges or bottom of the oil pool. Large quantities of oil, however, remain in the oil-bearing sand and are not recovered by this primary production. Various secondary production processes may then be employed to remove an additional quantity of oil and usually involve some form of gas drive or water drive or both. Even after the completion of the secondary production operations large quantities of oil remain in the sand; the amount of such remaining oil may be of the order of one-third to one-half the original quantity of oil in the reservoir.

Figure 2:
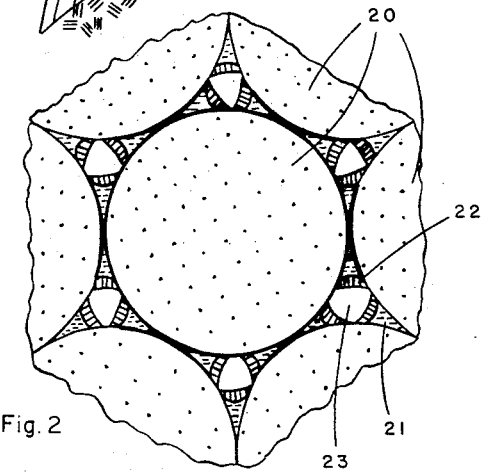
Fig. 2 is a diagrammatic view illustrating in greatly magnified size the distribution of water and oil about the sand grains in an oil-bearing formation after the removal of oil by primary production.
Figure 2A:
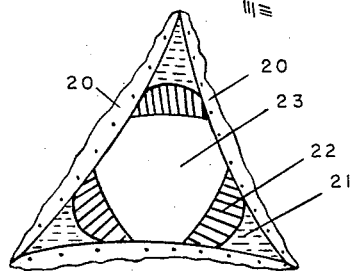
Fig. 2a is an enlarged view of a portion of the grains of Fig. 2.

For the most part the oil remaining in the depleted porous reservoir is believed to be held by capillary forces in discontinuous bodies in the capillary spaces of the reservoir. The oil-bearing formation initially contains an irreducible quantity of water and for the purpose of understanding the present invention this water may be considered to be locked in pendular rings about the contact points of sand grains and in other small cracks and capillaries. This irreducible water saturation and its discontinuous distribution will remain approximately constant throughout the life of the field provided no water encroachment occurs and no water is added. This condition prevails in fields produced by gravity drainage, gas cap expansion, solution gas drive, gas repressurizing operation and other such methods which do not involve the natural encroachment of water or the artificial injection of water. Under these conditions the oil remaining in the depleted reservoir collects about those minute bodies of water and the bodies of oil are discontinuous, that is, they are out of contact with one another. This discontinuous condition is represented in Figs. 2 and 2a which show a plurality of sand grains 20, represented as identical spheres, in point contact. About each point of contact is a pendular ring of water 21 and about the water rings are rings of oil 22. Hollow, gas-filled, spaces 23 lie between the grains 20 and the oil rings and are the spaces from which oil has been recovered by the production operations. All the rings of gas about the contact points of each spherical grain are in communication and hence the spaces 23 are continuous throughout the formation and thus constitute continuous gas paths through the oil-bearing sand or rock. The oil residual remaining in a reservoir depleted by a gravity drainage method may commonly be from fifteen percent to thirty percent of the pore volume.

In a reservoir depleted by a natural water drive (edge water encroachment) or an induced water drive such as is created in secondary recovery by water flood, the oil is held by capillary forces in discontinuous oil bodies surrounded by the continuous water phase. Although the continuous water phase may easily flow through the reservoir, the discontinuous oil bodies are locked in place by capillary forces and therefore cannot be recovered by any normal water flood or water drive mechanism. In that portion of the reservoir which has been successfully and completely water flooded, the oil residual may be from fifteen percent to thirty-five percent of the pore volume. However, due to the incomplete sweep coverage of most natural or induced water drives, large sections of the reservoir may be completely bypassed thereby leaving larger average residuals commonly from thirty percent to sixty percent of the total pore volume.

Figure 3:
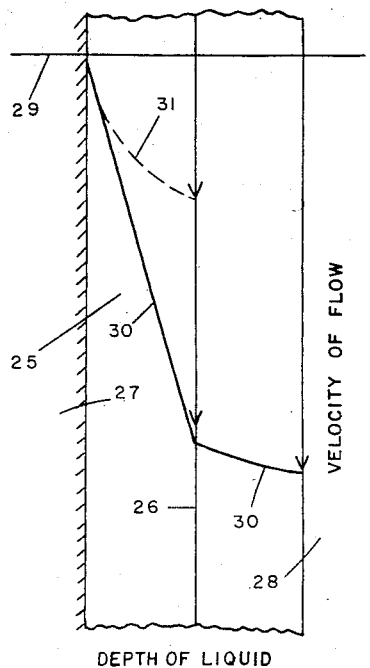
Fig. 3 is a graph illustrating the velocity characteristics of oil and water flowing by gravity.

In the course of my theoretical investigation leading to the present invention I found that, under idealized conditions, a layer of water flowing by gravity down a vertical surface and having a layer of oil on the surface of the water between the water and a gas, such as air, would flow at a velocity which might be of the order of twice the velocity of the same layer of water without the oil layer. Thus, if gravity flow of water is provided over a solid surface in a gas passage and oil is flowed onto the water-gas interface the oil will flow down the interface at a substantially higher velocity than that of the water alone. This velocity characteristic is illustrated in Fig. 3 which is a graph indicating under the idealized conditions, the velocity vectors in a vertical section of a layer of water 25 and a layer of oil 26 flowing down a vertical solid surface 27, the water being in engagement with the solid surface and the oil between the water and a gas 28. The velocities within the liquids are indicated by the vertical distances from a zero reference line 29 to a curve 30. A dotted parabolic curve 31 indicates the velocities existing in the layer of water 25 in the absence of the oil layer 26. The component of velocity due to each fluid is proportional to the density of the fluid and inversely proportional to its viscosity. The velocity of the water is increased from that of the curve 31 to that of the curve 30 because of force at the surface of the water due to the weight of the oil layer. The increase in velocity of the oil within the layer from the inner to the outer surface is represented by the lower portion of the curve 30. The viscosity of the oil affects only the velocity changes within the oil phase which are only a minor portion of the total velocity; thus high-viscosity oil may be transported at nearly the same velocity as low-viscosity oil, the principal component of velocity being that of the water at the water-oil interface. In effect the oil layer is carried downstream by the flowing water much as a raft is carried down a river.

My invention provides a process whereby the phenomena described above may be employed to increase production ratio and to recover increased amounts of oil from oil reservoirs including those which have been depleted by secondary production methods heretofore employed. The idealized conditions of flow over a large vertical flat solid surface as illustrated in Fig. 3 do not exist in nature; however, in general, oil can be expected to drain at a greater velocity over a layer of water than over a solid surface. In a porous oil reservoir the conditions of fluid flow are complex; however, if both the water phase and the gas phase can be maintained continuous, oil will drain down the gas-water interface. In using the term "gas-water interface" as indicated heretofore, the presence of a thin film of oil is not to be considered as interrupting the gas-water interface, and, furthermore, I consider the gas-water interface to be continuous as long as both the gas and water phases are continuous, a transported layer of oil or other contamination being considered as transient and not affecting the existence of the gas-water interface.

Figure 4:
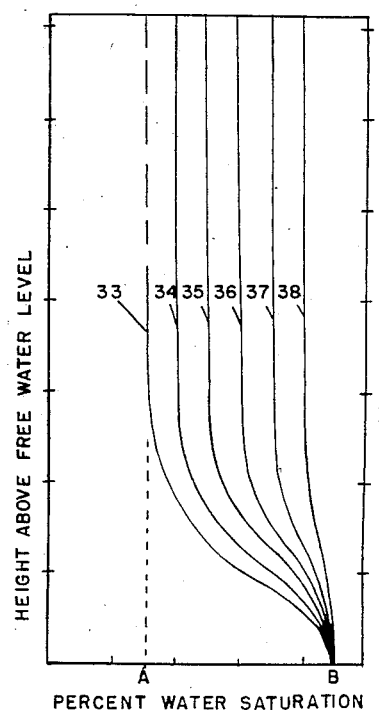
Fig. 4 is a graph illustrating water saturation characteristics of a typical reservoir.

In order to recover oil from a depleted reservoir by the process of my invention it is essential that a continuous gas-water interface be created and maintained within a substantial portion of the reservoir. This can be accomplished by adding water in an upper portion of the gas zone of a reservoir and allowing it to drain through the gas zone. The rate at which the water is added is determined in accordance with the saturation characteristics of the reservoir rock and must be determined for the individual reservoir. By way of example, Fig. 4 illustrates the water-saturation characteristics of a reservoir of uniform permeability for a plurality of different continuous rates of water addition at the top; the height above the free water level is shown along the vertical axis and the water saturation of the reservoir along the horizontal axis. On the graph a curve 33 represents the static conditions when no water is being added, the water phase being discontinuous over the dotted portion of the curve. Curves 34 through 38 represent the hydrodynamic conditions within the reservoir resulting from the continuous injection of water at the top of the reservoir at successively greater rates. Under each of these conditions of flow, the water saturation is nearly constant over the major portion of the reservoir and increases only near the lower portion which is the transition zone. In this reservoir any rate of flow providing a water saturation between the values at A and B results in maintaining continuous water-gas interfaces.

Figure 5:
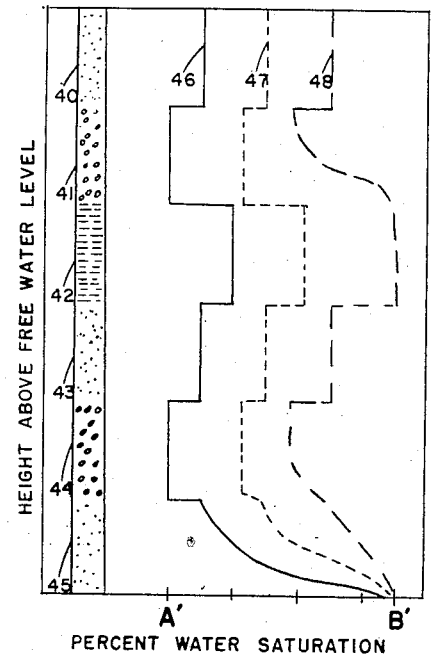
Fig. 5 is a graph illustrating characteristics similar to those of Fig. 4 in a multistrata oil-bearing formation.

In bedded reservoirs the permeability varies from one bed to the next and it becomes necessary to select water flow rates with respect to the lowest permeability to be encountered if the continuity of both the water and the gas phases is to be maintained. Fig. 5 illustrates the hydrodynamic conditions existing in a bedded reservoir when water is supplied to the top of the reservoir at different continuous rates. Six beds of differing permeability are shown, the top bed 40 having a permeability of 100 millidarcies and the succeeding lower beds 41, 42, 43, 44, and 45 having permeabilities of 1000, 10, 100, 1000 and 100 millidarcies, respectively. Curves representing three different continuing rates of water injection are shown—a full line curve 46 representing a low rate; a dotted line curve 47, a medium rate; and a dash line curve 48, a high rate of injection. The curves 46 and 47 are generally similar to the curves 34 through 38 of Fig. 4 and are essentially at constant values of saturation for each bed until the transition zone is reached for the curve 47 in the lower portion of the bed 44 and for the curve 46 in bed 45. The percentage saturation for each curve is, of course, different for each different permeability. The curve 48, however, includes a discontinuous gas phase portion in the 1000 md. bed 41 and in the 10 md. bed 42 as well as at its lower end. This condition arises because the low permeability bed 42 has reached the maximum water saturation value B' and constitutes a restriction causing the water to back up in the bed 41 until a sufficient head has been built up to force the water through the bed 42 at the same rate at which it is being injected. This condition is not satisfactory for the recovery of oil because the oil moving downward through the bed 41 will accumulate above the zone of discontinuous gas phase. The accumulation of oil will continue until a sufficient oil column has been built up to produce a capillary pressure exceeding the entry pressure of the restricting bed 42. This accumulation of oil should therefore be avoided by using the pulse system described below or by limiting the water injection rate to a lower value such as that of the curve 47 so that the water-gas interface is continuous throughout all beds of the reservoir above the transition zone.

Figure 6:
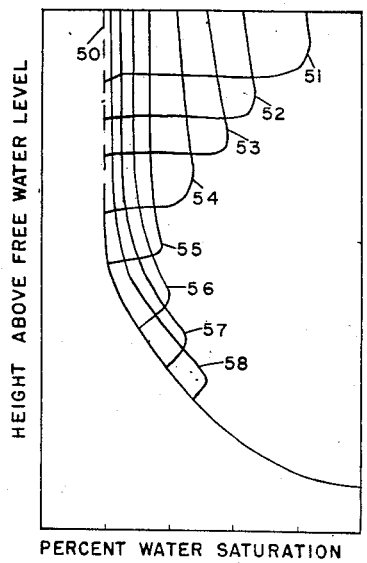
Fig. 6 is a graph illustrating further water flow characteristics of a typical reservoir.

For some types of reservoirs a sweeping or scanning of the oil-bearing formation over a wide range of water saturations will facilitate the release and recovery of the oil. This scanning action can be secured by pulsed or periodic injection; the periods between pulses may range from less than a day to several weeks depending upon the characteristics of the particular reservoir. During each pulse the injection may begin at a high rate such as that of curve 48 of Fig. 5 and then decrease to the lower rates of curves 47 and 46, or the injection may be terminated to allow drainage until the lower values of water saturation are obtained. Again the type of pulse best suited to a particular oil-bearing reservoir will depend upon the characteristics of the reservoir. When a given quantity or pulse of water is injected near the top of the gas zone of a reservoir it can be expected to drain downwardly somewhat in the manner shown in Fig. 6. This graph shows a dotted line 50 which is the static saturation curve of a uniform permeability reservoir corresponding to the curve 33 of Fig. 4. When a pulse of water is injected at the top of the reservoir its position at the end of each of a plurality of successive periods of time is represented by curves 51 through 58, inclusive. The maximum saturation of the pulses is progressively less with time and the length of the pulse is greater. Thus the pulse has spread or widened and thereby decreased its percentage saturation as it drains down through the reservoir. This pulse draining pattern will vary with the duration of the pulse from that of a short pulse to the flow pattern of continuous injection as represented by the curves of Fig. 4.

When the process of my invention is to be employed to recover oil from a depleted or partially depleted reservoir it is desirable that the water be injected over as wide an area of the reservoir as possible. For this purpose fracturing of the oil-bearing formation may be employed as indicated in Fig. 7, which shows a reservoir having an oil-bearing formation 60 into which seven wells 61a, 61b, 61c, 62a, 62b, 63a and 63b have been driven. The gas cap indicated at 64 is the gas cap which results from the expansion of the original gas cap plus the accumulation of solution gas evolved from the oil plus any additional gas injected into the reservoir. The oil producing zone is indicated at 65. The four wells 62a, 62b, 63a and 63b are normal oil producing wells which are still producing oil by conventional methods. The three wells 61a, 61b, 61c which penetrate the expanding gas cap in the depleted oil zone are prepared for this recovery process by fracturing. One fracture 66a, 66b and 66c is produced near the top of the reservoir around each well and another fracture 69a, 69b and 69c is produced near the bottom of the reservoir at each well. The top fracture may be used for injecting water or gas or both and the bottom fracture may be used for withdrawing fluids. When a bottom fracture is employed it provides the advantages of minimizing the "coning" of fluids in the reservoir during the withdrawing or producing operation; thus a bottom fractured reservoir will not go to water or gas before substantially all the oil has been recovered. The arrangement of the wells and fractures is shown in Fig. 8, which is an enlarged section view of the well 61b. A production tube 75 extends within the casing to the bottom of the well and a plug or packer 76 is set between this tubing and the outer casing just below the level of the upper fracture 66b. The upper fracture is in communication with the interior of the outer casing 61b through a plurality of openings 74 formed about the circumference of the casing by gun perforation or other suitable method. Perforations are employed together with fracturing techniques in creating the upper fracture and provide direct communication with the fracture as clearly shown in the enlarged detail view, Fig. 9.

If a depleted reservoir is filled with water then gas cap expansion must be employed to drive the water down and fill the reservoir with gas as a first step in carrying on the process of the invention. The rate at which water should be added is then determined from a knowledge of the structure and of the permeability and saturation characteristics of the reservoir rock. The water is then injected into the upper fracture 66b from the casing 61b and drains downwardly from the fracture 66b toward the lower fracture 69b. By injecting the water in such amounts and frequency that the percentage water saturation of the reservoir rock is between values corresponding to those indicated at A and B in Fig. 4 for a substantial percentage of the time, then both the water and gas phases are continuous throughout substantially the entire reservoir between the fractures. Oil previously held in discontinuous bodies throughout the reservoir rock then drains downwardly on the continuous gas-water interface toward the fracture 69b where it collects. When sufficient oil has collected for commercial production purposes, it is recovered through the production tubing 75 which is connected to the lower fracture 69b. The water may be supplied at a continuous rate or may be pulsed at predetermined intervals depending upon the nature of the reservoir rock; in either case the process is continued as long as oil is recovered in economical quantities.

The manner in which my invention is practiced may vary with different types of oil reservoirs, and in Fig. 10 I have illustrated the application of my process to a steeply dipping reservoir bounded on the up-dip side by a fault, salt-dome or other barrier 80a, the reservoir rock 77 extending at about forty-five degrees to the horizontal. Two types of well completions are illustrated by wells 78 and 79. Well 78 is used for the injection of water or gas or both whereas well 79 is used for the withdrawal of fluids. The casing of the upper well 78 terminates in the upper portion of the reservoir rock adjacent the cap rock 80, the remaining portion of the well having no casing. The reservoir rock is fractured at 81 about the well 78 adjacent the cap rock. In some cases a plurality of fractures may be used around the well 78 to obtain a better distribution of the injected water. The production well 79 may be completed with no fracture, with a single fracture 82, or a plurality of fractures, depending upon the characteristics of the reservoir, the dip of the structure and the location of the water level and gas cap. Water at the predetermined rate necessary to maintain continuous water and gas phases through the reservoir rock is then injected through the casing 78 and drains down through the reservoir toward the lower well 79. Oil flows along the continuous water-gas interfaces and drains toward the lower producing well 79 from which it is removed when a sufficient quantity has accumulated.

When a bedded reservoir is steeply dipped as in Fig. 10, the boundary effects such as that illustrated in Fig. 5 are less effective because a substantial quantity of the water drains along the bedded formations rather than between them. Thus the accumulation of oil due to boundary conditions is minimized and more oil is recovered from the reservoir.

The process of my invention may be employed to effect recovery from a single well in a field or from a group of wells less than the total number in the field without extending the recovery operation to the remaining wells. For example, in the case of a well located in a depleted, water-flooded portion of the reservoir my invention may be applied by first fracturing the reservoir rock adjacent the top and bottom of the well as is illustrated by the fractures adjacent the wells 61b in Figs. 7 and 8. Gas is then injected through the bottom fracture to drive the water from the reservoir in the zone between the fractures and to spread beyond the zone. When the water has been displaced, treatment water is injected periodically in pulses through the top fracture to secure the required gas-water interfaces and the oil is thereby drained down the interfaces to collect in the lower fracture and in the bottom of the reservoir. The accumulated oil is removed through the lower production well in the usual manner. In order to control the zone under treatment and to prevent undesired migration of the gas to the areas of other wells, gas is withdrawn as required through the upper well in the intervals between water pulses. Additional gas may be injected through the bottom well and fracture as required for further treatment between withdrawals of the accumulated oil. The process is continued until the economic limit of production has been reached whereupon gas may be withdrawn through the upper well to permit re-flooding of the treated zone.

My new recovery process is particularly suited to the production of oil from reservoir rocks which has no bedding planes of different permeabilities or have thick beds. In bedded rocks the boundary effects may somewhat decrease the total possible recovery. The principal boundary condition which limits the total recovery is due to capillary effect and occurs when the water and oil must flow from one bed into another bed having larger pore spaces. This may be termed "end effect" and will occur in a zone consisting of the bottom one to three feet of each fine-grained layer which has a coarser-grained reservoir immediately below it. This effect is a significant factor only in flat or very low dip beds and is relieved when the beds are inclined.

It appears that the ratio of the gas-oil interfacial tension to the oil-water interfacial tension has a bearing on the rate and effectiveness of the recovery of oil and that by adjusting these interfacial tensions for each reservoir according to the characteristics of the reservoir rock and fluids some further advantage may be secured. The above ratio appears to be important as a factor determining the amount of oil held in stable geometry positions as compared with the oil that is free to move with the migrating oil layers, and further in determining the magnitude of the end effect at the boundaries of beds of different pore space dimensions and also the efficiency of recovery from erratic permeability reservoirs such as reefs and irregular limestones. By testing samples of the reservoir rock and fluids in the laboratory under different pressures and with different gases and also with different surface active agents, such as detergents, added to the water, an optimum selection of these factors may be determined empirically such that further increased recovery may be realized in the practice of my invention. Temperature is also a factor in some cases but is difficult to control economically.

The process of my invention may be applied to a wide range of types of reservoirs in addition to the granular porosity type. For example, this process may be employed in reservoirs having fracture porosity in very tight, low permeability rock, and also in reservoirs having regular porosity such as reefs and limestone and carbonate rock. One significant application is that of recovery of oil from low-permeability rock having a very high ratio of pore surface to reservoir volume. When a reservoir having this high ratio contains an oil having a positive spreading tendency, high recovery may be realized by employing the process of my invention and utilizing the spreading tendency. In this case the oil spreads in a very thin (including monomolecular film) film over the continuing gas-water interfaces and the water carries the film downwardly continually. The flow of the oil film may be maintained continuously, the oil collecting at the bottom of the reservoir, until substantially all of the oil has been removed and the oil saturation approaches zero. For some oils and under favorable conditions, this method of recovery may be economical.

While I have illustrated and described my invention in its application to the recovery of petroleum and particularly to recovery from granular porosity reservoirs, other applications and modifications of my invention will occur to those skilled in the art; therefore, I do not desire my invention to be limited to the specific details disclosed and I intend by the appended claims to cover all modifications which fall within the spirit and scope of my invention.

I claim:

1. The method of increasing the total recovery of oil from an oil reservoir having a gas zone in an oil bearing formation from which some oil has been displaced which comprises creating a continuous downwardly extending gas-water interface by admitting to an upper portion of the gas zone and permitting to drain down therethrough a quantity of water sufficient to produce continuity of the water phase through a substantial area of the gas zone but insufficient to break the continuity of the gas phase therein, permitting oil to move downwardly along the gas-water interface and accumulate below the zone, and producing the accumulated oil.

2. The method of increasing the total recovery of oil from an oil reservoir having a gas zone in an oil bearing formation from which some oil has been displaced which comprises creating a continuous downwardly extending gas-water interface by admitting charges of water at time spaced intervals to the upper portion of the gas zone and permitting them to drain down therethrough, each charge of water being in a quantity sufficient to produce continuity of the water phase through a substantial area of the gas zone but insufficient to produce water saturation in said area and break the continuity of the gas phase therein, the intervals of time between said charges being sufficient to avoid flooding due to overlapping flow from successive charges, permitting oil to move downwardly along the gas-water interface and accumulate below the zone, and producing the accumulated oil.

3. The method of increasing the recovery of oil from an oil reservoir having a gas zone which comprises fracturing a substantial area of a bedding plane in the upper portion of the gas zone and injecting water into the fractured area for lateral distribution over the area, the quantity of water being sufficient to produce continuity of the water phase through a substantial portion of the gas zone downwardly from the fractured area but insufficient to break the continuity of the gas phase therein.

4. In the recovery of oil from a reservoir having a gas zone, the method of increasing the amount of recovery which comprises fracturing a first substantial area along a bedding plane in an upper portion of the gas zone, fracturing a second substantial area along a bedding plane in a lower portion of the reservoir, and injecting water into the upper fractured area for drainage downwardly through the gas zone, the quantity of water being sufficient to produce continuity of the water phase through a substantial portion of the gas zone but insufficient to break the continuity of the gas phase therein.

5. In the recovery of oil from a steeply dipped reservoir having a production well and a gas zone above the well, the method of increasing the oil recovery from the reservoir which comprises providing a well in the upper portion of the gas zone, fracturing the upper portion of the reservoir about the well and maintaining communication between the well and the fracture, and injecting water into the fracture for drainage downwardly and along the reservoir through the gas zone, the quantity of water being sufficient to produce continuity of the water phase through a substantial portion of the gas zone but insufficient to break the continuity of the gas phase therein.

6. In the recovery of oil from an oil reservoir having a gas zone in an oil bearing formation from which some oil has been displaced, the method of increasing the rate of recovery which comprises creating a continuous downwardly extending gas-water interface by admitting to an upper portion of the gas zone and permitting to drain down therethrough a quantity of water sufficient to produce continuity of the water phase through a substantial area of the gas zone but insufficient to break the continuity of the gas phase whereby oil flows down the continuous gas-water interface and accumulates below said gas zone, controlling the values of the gas-oil interfacial tension and the oil-water interfacial tension by selecting optimum values determined by tests of the reservoir fluids to effect an increased recovery of oil by movement down the water-gas interface, and producing the accumulated oil.

7. In the recovery of oil from an oil reservoir, the method of increasing the rate of recovery as set forth in claim 6 wherein the control of said interfacial tensions is effected by selection of the gas used in the reservoir and the pressure of the gas and by introducing an additive agent to the water.

8. The method of recovering oil having a positive spreading tendency and distributed in minute quantities throughout the pores of an oil reservoir having a high surface area to bulk volume ratio and having a gas zone in an oil bearing formation from which some oil has been displaced, which comprises creating a continuous downwardly extending gas-water interface by admitting to an upper portion of the gas zone and permitting to drain downwardly through said zone a quantity of water sufficient to produce continuity of the water phase through a substantial area of the gas zone but insufficient to break the continuity of the gas phase therein whereby a film of oil spreads over the gas-water interface and moves continuously to the lower portion of the gas zone for accumulation therein, and producing the accumulated oil.

9. In the recovery of oil from a water-filled reservoir constituting a portion of a field and having a well, the method of recovering oil from the reservoir which comprises fracturing the reservoir about the top of the well and about the bottom thereof, injecting gas through the bottom fracture to displace the water in the reservoir to produce and maintain a gas zone, injecting water periodically into the upper fractured area for downward drainage through the gas zone in quantities sufficient to produce continuity of the water phase within the gas zone and insufficient to break the continuity of the gas phase, producing the accumulated oil through the bottom fracture between periods of injection of gas, and controlling the migration of gas through the reservoir to other portions of the field by withdrawing gas through the upper fracture during the periods between the injection of water.

10. The method of recovering a liquid from the pore spaces of a permeable porous reservoir of solid material having a gas zone therein within which discontinuous bodies of the liquid are held in such pore spaces which comprises admitting to an upper portion of the gas zone and permitting to drain downwardly therethrough a second liquid which wets the solid material surface preferentially with respect to the first liquid and on which the first liquid will distribute itself as a layer, the second liquid being admitted in a quantity sufficient to produce continuity of the second liquid phase but insufficient to break the continuity of the gas phase, thereby creating a continuous gas to second liquid interface, permitting the first liquid to move down along said interface and accumulate in the reservoir below said gas zone, and removing the accumulated first liquid from the reservoir.

References Cited in the file of this patent

UNITED STATES PATENTS

| | | |
|---|---|---|
| 2,369,831 | Jones et al. | Feb. 2, 1945 |
| 2,687,179 | Dismukes | Aug. 24, 1954 |
| 2,725,106 | Spearow | Nov. 29, 1955 |
| 2,754,911 | Spearow | July 17, 1956 |

OTHER REFERENCES

Squires: Model of Reservoir, World Oil, October 1947, pages 145 to 148, page 146 in particular.